(12) United States Patent
Fox et al.

(10) Patent No.: US 11,526,344 B2
(45) Date of Patent: *Dec. 13, 2022

(54) DISTRIBUTED GEOIP INFORMATION UPDATING

(71) Applicant: MASTERCARD TECHNOLOGIES CANADA ULC, Vancouver (CA)

(72) Inventors: Justine Celeste Fox, Pitt Meadows (CA); Marc Grimson, Vancouver (CA)

(73) Assignee: MASTERCARD TECHNOLOGIES CANADA ULC, Vancouver (CA)

(*) Notice: Subject to any disclaimer, the term of this patent is extended or adjusted under 35 U.S.C. 154(b) by 89 days.

This patent is subject to a terminal disclaimer.

(21) Appl. No.: 16/984,427

(22) Filed: Aug. 4, 2020

(65) Prior Publication Data

US 2022/0043644 A1    Feb. 10, 2022

(51) Int. Cl.
  *G06F 8/65*   (2018.01)
  *G06F 16/29*  (2019.01)
  *G06F 16/23*  (2019.01)

(52) U.S. Cl.
  CPC .......... *G06F 8/65* (2013.01); *G06F 16/2379* (2019.01); *G06F 16/29* (2019.01)

(58) Field of Classification Search
  CPC ....................................................... G06F 8/65
  See application file for complete search history.

(56) References Cited

U.S. PATENT DOCUMENTS

| | | | |
|---|---|---|---|
| 7,562,104 B2 | 7/2009 | Cadiz et al. | |
| 7,693,886 B1 | 4/2010 | Novick et al. | |
| 8,701,103 B1* | 4/2014 | Hsu | G06F 8/65 717/171 |
| 9,298,843 B1 | 3/2016 | Jenkins et al. | |
| 10,257,069 B1* | 4/2019 | Ingram | H04L 41/0893 |
| 2006/0087956 A1 | 4/2006 | Carson | |
| 2010/0088499 A1 | 4/2010 | Zimmer et al. | |
| 2013/0282523 A1 | 10/2013 | Pfeffer et al. | |

(Continued)

FOREIGN PATENT DOCUMENTS

WO    2020047416 A1    3/2020

OTHER PUBLICATIONS

International Search Report and Written Opinion for Application No. PCT/CA2021/051075 dated Oct. 26, 2021 (8 pages).

(Continued)

*Primary Examiner* — Duy Khuong T Nguyen
(74) *Attorney, Agent, or Firm* — Michael Best & Friedrich LLP (57) ABSTRACT

Methods and systems for providing distributed GeoIP information updating. One method includes receiving, with a data processing server, an update event associated with an update to an active version of GeoIP information, the active version of the GeoIP information is actively accessible by an application execution server for request enrichment. The method also includes generating, with the data processing server, an updated version of the GeoIP information according to the update. The method also includes replacing, with the data processing server, the active version with the updated version in storage, where, in response to storing the updated version, the updated version is actively accessible by the application server for request enrichment.

20 Claims, 7 Drawing Sheets

(56) References Cited

U.S. PATENT DOCUMENTS

| | | |
|---|---|---|
| 2014/0052636 A1 | 2/2014 | Mattes |
| 2014/0095249 A1 | 4/2014 | Tarakad et al. |
| 2016/0260136 A1 | 9/2016 | Schwartz et al. |
| 2016/0350400 A1 | 12/2016 | Zhu et al. |
| 2016/0381049 A1 | 12/2016 | Lakhani et al. |
| 2017/0134419 A1 | 5/2017 | Kumar |
| 2017/0359329 A1 | 12/2017 | Sharifi et al. |
| 2018/0027006 A1 | 1/2018 | Zimmermann et al. |
| 2018/0242138 A1 | 8/2018 | Chen |

OTHER PUBLICATIONS

International Search Report and Written Opinion for Application No. PCT/CA2021/051074 dated Oct. 26, 2021 (8 pages).

\* cited by examiner

DISTRIBUTED GEOIP INFORMATION UPDATING

FIELD

Embodiments described herein relate to distributed enrichment information updating, and, more particularly, to distributed GeoIP information updating.

BACKGROUND

In many applications, there is a need to identify the validity of a request based on request metadata. For example, some applications may need to identify the validity of user agent information present in request metadata. Alternatively or in addition, some applications may need to identify and collaborate physical location information to virtual location information (GeoIP information). These applications typically use a traditional database system, which is based on SQL technology (use a relational approach with a fixed data schema). A technical challenge with this is that a database may only support a single writeable master node, process, or instance. Accordingly, these approaches struggle to scale to millions of requests per second without specialized caching strategies that are one-off. Additionally, update mechanisms struggle to update information (for example, lists of user agent related information and GeoIP related information) that is actively used by applications. Accordingly, such update mechanisms generally attempt updates pursuant to a set update pattern (such as once a week or once a month), but not in real time (or near real time).

SUMMARY

Embodiments described herein provide for methods and systems for providing distributed enrichment information updating. Embodiments described herein analyze a request and enrich the request by adding enrichment information related to the request metadata. Enrichment information may include, for example, GeoIP related information, such as a correlation between a physical location and a virtual location, user agent related information, and the like. For example, for GeoIP related enrichment, embodiments may analyze a request to identify an Internet Protocol ("IP") address in the request metadata and enrich the request by supplementing the request metadata with geographical information (stored in a GeoIP data store) for the IP address present in the request metadata. As another example, for user agent related enrichment, embodiments may analyze a request to identify a user agent associated with the request and enrich the request by supplementing the request metadata with metadata about the user agent for the user agent present in the request.

The enriched request is ultimately validated based on the supplemented request metadata. For example, when the supplemented request metadata indicates a mismatch between a physical location associated with the request, such as a billing address or a shipping address, and a virtual location associated with the request, such as an IP address, the request may be determined to be fraudulent. As another example, when the supplemented request metadata indicates that a web browser (the user agent associated with the request) is not running JavaScript when JavaScript is available in the operating system of the web browser, the request may be determined to be fraudulent.

Embodiments leverage a decoupled and distributed system design that supports dynamic updates to the stored enrichment information while enabling concurrent request enrichment using the stored enrichment information. In other words, embodiments described herein enable the concurrent use of the stored enrichment information while the stored enrichment information is dynamically updated. Accordingly, embodiments described herein may handle updates in real time (or near real time) without interrupting the accessibility of the stored enrichment information actively being used by applications for request enrichment.

The embodiments described herein implement updates to the enrichment information using a distributed notification architecture where updates are handled out-of-band, enabling incremental, partial, or full replacement of enrichment information. The decoupled design is optimized for scaling to approximately 10,000,000 queries or requests per second. For example, updates may be distributed across multiple different applications or geographical regions because of the decoupled nature of the embodiments described herein such that multiple different enrichment information database instantiations may be available. Additionally, the embodiments described herein are implemented with a schema that is flexible, enabling related information (for example, enrichment information) to be appended or supplemented to request metadata.

For example, one embodiment provides a method for providing distributed GeoIP information updating. The method includes receiving, with a data processing server, an update event associated with an update to an active version of GeoIP information, the active version of the GeoIP information is actively accessible by an application execution server for request enrichment. The method also includes generating, with the data processing server, an updated version of the GeoIP information according to the update. The method also includes replacing, with the data processing server, the active version with the updated version in storage, where, in response to storing the updated version, the updated version is actively accessible by the application server for request enrichment.

Another embodiment provides a system for providing distributed GeoIP information updating. The system includes an application execution server. The application execution server is configured to receive enrichment request including request metadata. The application execution server is also configured to, in response to the request metadata including a data attribute, access an actively accessible version of GeoIP information associated with the data attribute, where the GeoIP information is dynamically updated while at least one version of the GeoIP information is actively accessible, and enrich the request by supplementing the request metadata with the actively accessible version of the GeoIP information. The application execution server is also configured to generate an enriched request for request validation.

Yet another embodiment provides a non-transitory, computer-readable medium storing instructions that, when executed by an electronic processor, perform a set of functions. The set of functions includes receiving a request including request metadata. The set of functions also includes determining whether the request metadata includes a set of data attributes. The set of functions also includes, in response to the request metadata including the set of data attributes, accessing an actively accessible version of GeoIP information associated with the set of data attributes, where the GeoIP information is dynamically updated while at least one version of the GeoIP information is actively accessible, and enriching the request by supplementing the request metadata with the actively accessible version of the GeoIP information. The set of functions also includes enabling access to the enriched request for request validation.

Yet another embodiment provides a system for providing distributed user agent information updating. The system includes a data processing server. The data processing server is configured to receive an update event associated with an update to an active version of user agent information, the active version of the user agent information actively accessible for request enrichment. The data processing server is also configured to generate an updated version of the user agent information according to the update. The data processing server is also configured to replace the active version with the updated version in storage, where, in response to storing the updated version, the updated version is actively accessible for request enrichment.

Yet another embodiment provides a non-transitory, computer-readable medium storing instructions that, when executed by an electronic processor, perform a set of functions. The set of functions includes receiving a request including request metadata. The set of functions also includes determining whether the request metadata includes a set of data attributes. The set of functions also includes, in response to the request metadata including the set of data attributes, accessing an actively accessible version of user agent information associated with the set of data attributes, where the user agent information is dynamically updated while at least one version of the user agent information is actively accessible, and enriching the request by supplementing the request metadata with the actively accessible version of the user agent information. The set of functions also includes enabling access to the enriched request for request validation.

Yet another embodiment provides a method for providing distributed user agent information updating. The method includes receiving, with a data processing server, an update event associated with an update to an active version of user agent information, the active version of the user agent information is actively accessible by an application execution server for request enrichment. The method also includes generating, with the data processing server, an updated version of the user agent information according to the update. The method also includes replacing, with the data processing server, the active version with the updated version in storage, where, in response to storing the updated version, the updated version is actively accessible by the application server for request enrichment.

Other aspects of the embodiments described herein will become apparent by consideration of the detailed description and accompanying drawings.

Other aspects of the embodiments described herein will become apparent by consideration of the detailed description.

DETAILED DESCRIPTION OF THE EMBODIMENTS

Before embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and may include electrical connections or couplings, whether direct or indirect. Also, electronic communications and notifications may be performed using any known means including direct connections, wireless connections, etc.

A plurality of hardware and software based devices, as well as a plurality of different structural components may be utilized to implement the embodiments described herein. In addition, embodiments described herein may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects of the embodiments described herein may be implemented in software (for example, stored on non-transitory computer-readable medium) executable by one or more processors. As such, it should be noted that a plurality of hardware and software based devices, as well as a plurality of different structural components, may be utilized to implement the embodiments described herein. For example, "mobile device," "computing device," and "server" as described in the specification may include one or more electronic processors, one or more memory modules including non-transitory computer-readable medium, one or more input/output interfaces, and various connections (for example, a system bus) connecting the components.

It should be understood that although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Figure 1:
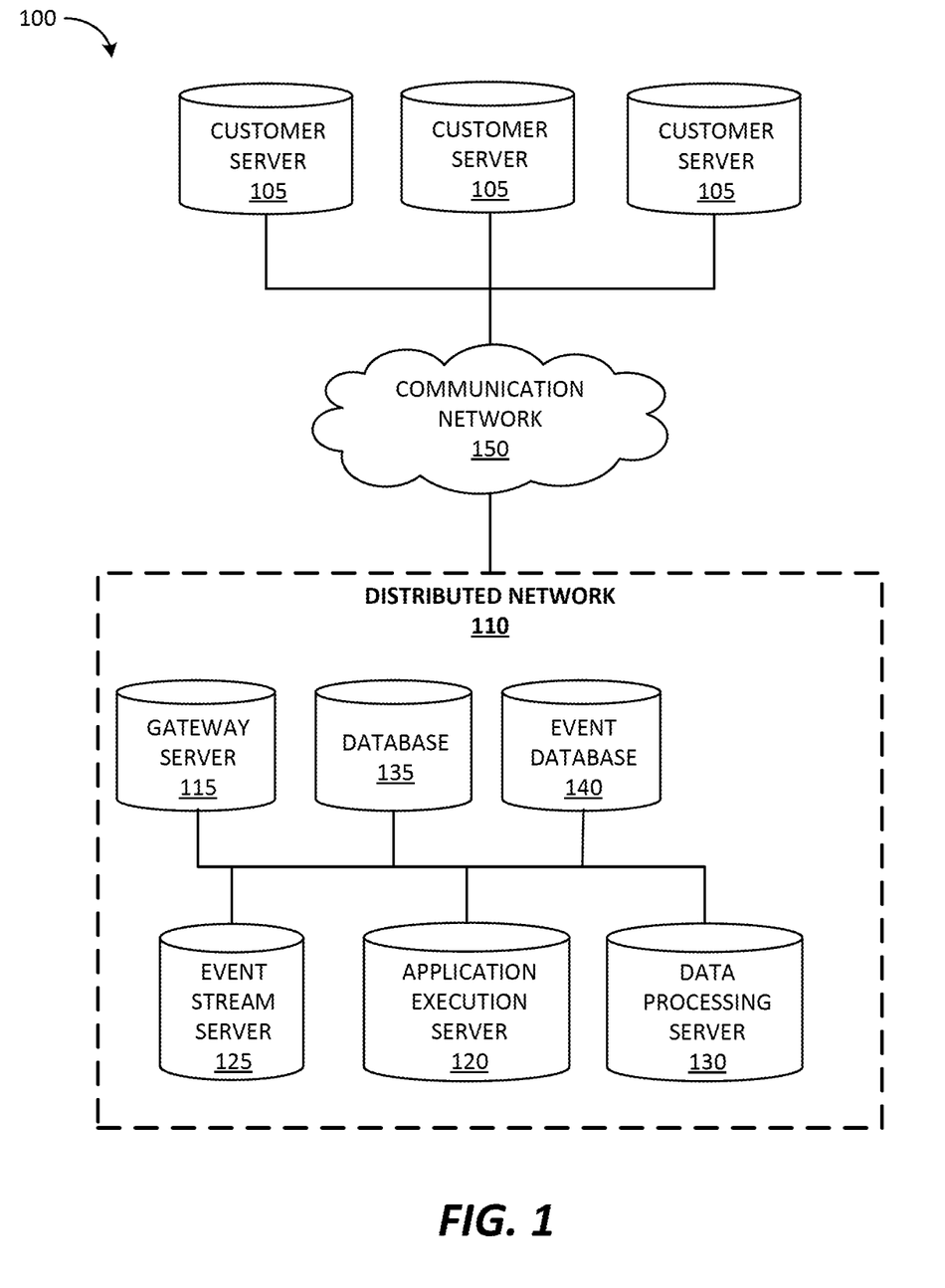
FIG. 1 is a block diagram of a system for providing distributed enrichment information updating according to some embodiments.

FIG. 1 is a block diagram of a system 100 providing distributed enrichment information updating according to some embodiments. In the example shown, the system 100 includes a plurality of customer servers 105 (referred to herein collectively as "the customer servers 105" and individually as "the customer server 105") and a distributed network 110 (referred to herein as "the network 110"). In the illustrated example, the network 110 includes a gateway server 115, an application execution server 120, an event stream server 125, a data processing server 130, a database 135, and an event database 140 (referred to herein collectively as "the one or more components of the network 110"). In some embodiments, the system 100 includes fewer, additional, or different components than illustrated in FIG. 1. For example, the system 100 may include a different number of customer servers and the three customer servers 105 included in FIG. 1 are purely for illustrative purposes.

The customer servers 105 and the network 110 (including the one or more components of the network 110) are communicatively coupled via a communication network 150. The communication network 150 is an electronic communications network including wireless and wired connections. Portions of the communication network 150 may be implemented using a wide area network, such as the Internet, a local area network, such as a Bluetooth™ network or Wi-Fi, and combinations or derivatives thereof. Alternatively or in addition, in some embodiments, components of the system 100 communicate directly with each other as compared to communicating through the communication network 150. For example, in some embodiments, the gateway server 115, the application execution server 120, the event stream server 125, the data processing server 130, the database 135, and the event database 140 communicate directly with each other over one or more wired communication lines or buses, as illustrated in FIG. 1. Also, in some embodiments, the components of the system 100 communicate through one or more intermediary devices not illustrated in FIG. 1.

Figure 2:
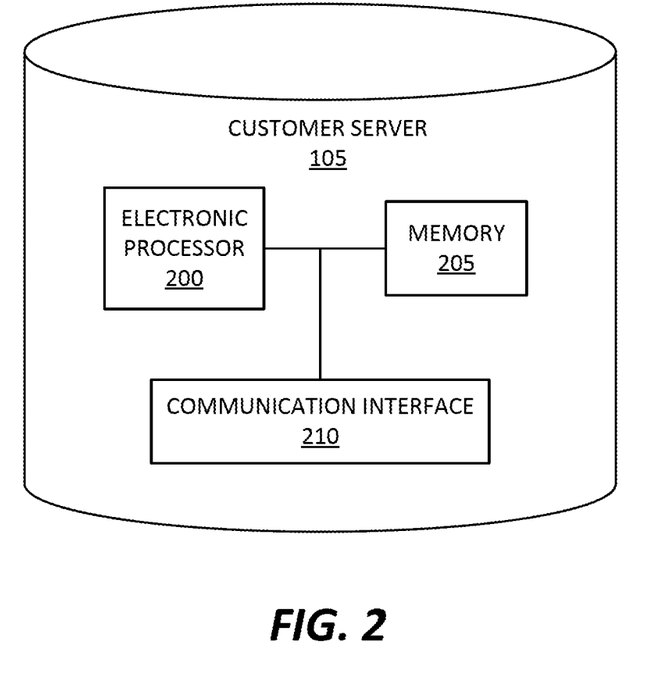
FIG. 2 is a block diagram of a customer server of the system of FIG. 1 according to some embodiments.

The customer server 105 may be a computing device and may include a desktop computer, a terminal, a workstation, a laptop computer, a tablet computer, a mobile device, or the like. As illustrated in FIG. 2, the customer server 105 includes an electronic processor 200 (for example, a microprocessor, an application-specific integrated circuit, or another suitable electronic device for processing data), a memory 205 (for example, a non-transitory computer-readable medium or another suitable memory device), and a communication interface 210. The electronic processor 200, the memory 205, and the communication interface 210 communicate wirelessly, over one or more communication lines or buses, or a combination thereof. The customer server 105 may include additional, fewer, or different components than those illustrated in FIG. 2 in various configurations. For example, although not illustrated, the customer server 105 may include a human-machine interface including one or more input devices, one or more output devices (for example, a display device), or a combination thereof.

The electronic processor 200 is configured to access and execute computer-readable instructions ("software") stored in the memory 205. The software may include firmware, one or more applications, program data, filters, rules, one or more program modules, and other executable instructions. For example, the software may include instructions and associated data for performing a set of functions, including the methods described herein.

The communication interface 210 allows the customer server 105 to communicate with devices external to the customer server 105. For example, as illustrated in FIG. 1, the customer server 105 may communicate with the network 110 through the communication interface 210. In particular, the communication interface 210 may include a port for receiving a wired connection to an external device (for example, a universal serial bus ("USB") cable and the like), a transceiver for establishing a wireless connection to an external device (for example, over one or more communication networks 150, such as the Internet, local area network ("LAN"), a wide area network ("WAN"), and the like), or a combination thereof.

The customer server 105 may provide an application (or service) to a user (for example, an end user, a group of users, an organization, another user entity, and the like). The user may interact with the customer server 105 either directly or indirectly via one or more intermediary devices (not shown). In some embodiments, the customer server 105 is part of a computing network, such as a distributed computing network, a cloud computing service, or the like. In such embodiments, the customer server 105 may communicate with the network 110 as part of providing a cloud-based service to a user using a user device (not shown). Alternatively or in addition, the customer server 105 may be a user device used directly by a user to interact with the network 110. The customer server 105 may interact with the network 110 (via, for example, the communication network 150) to leverage or access application functionality supported or provided by the network 110. In some embodiments, the network 110 supports a web application, such as a financial services application, an ecommerce application, and the like. For example, the network 110 may support a financial services application providing financial services such that a user may access a corresponding user account to interact with and manage financial transactions, services, data, and the like. Alternatively or in addition, in some embodiments, the network 110 supports a web application providing supplemental functionality for a different application or service, such as supplemental security functions or mechanisms for a financial services application or an ecommerce service. For example, the network 110 may support request enrichment functionality, request validation functionality, fraud detection and monitoring functionality, and the like for an application supported by one or more of the customer servers 105.

As noted above and illustrated in FIG. 1, the network 110 includes the gateway server 115, the application execution server 120, the event stream server 125, the data processing server 130, the database 135, and the event database 140. However, in some embodiments, the network 110 includes additional, fewer, or different components than illustrated in FIG. 1 in various configurations.

Figure 3:
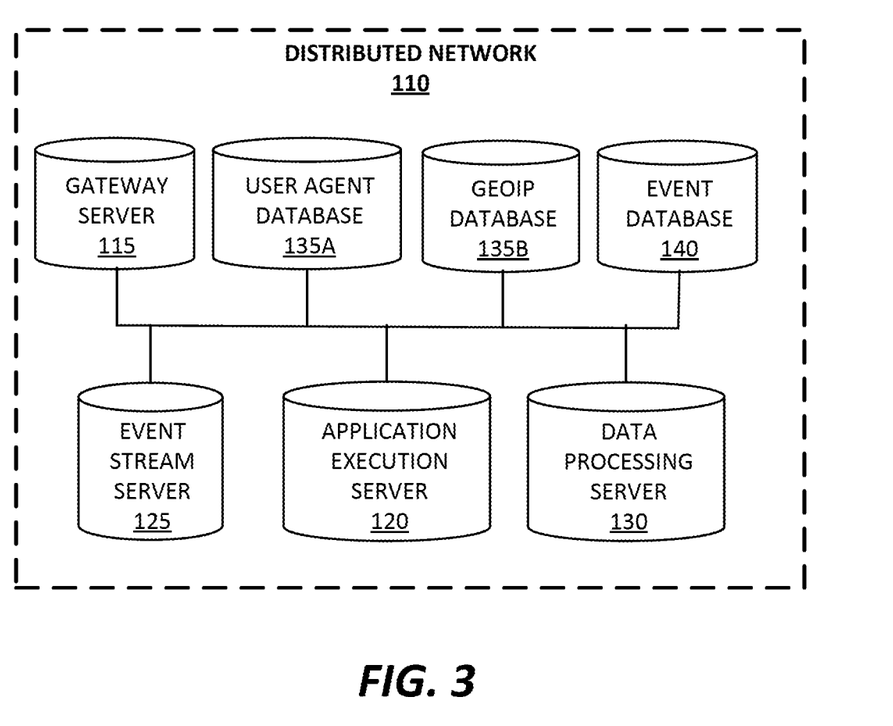
FIG. 3 illustrates a distributed network for the system of FIG. 1 according to some embodiments.

Alternatively or in addition, in some embodiments, the functionality (or a portion thereof) described as being provided by the network 110, one or more components of the network 110, or a combination thereof may be distributed among multiple networks, devices, servers, and the like. For example, as illustrated in FIG. 3, in some embodiments, functionality of the database 135 may be distributed among multiple databases, such as a user agent database 135A storing user agent related information and a GeoIP database 135B storing GeoIP related information. In other words, the data stored in the database 135 (for example, user agent related information and GeoIP related information) may be distributed among multiple databases or storage devices.

Alternatively or in addition, in some embodiments, the functionality (or a portion thereof) described as being provided by the network 110, one or more components of the network 110, or a combination thereof may be combined into a single device or server. For example, in some embodiments, the network 110 may include a single device or server (for example, a network server or a web server) configured to provide the functionality described herein as being provided by the one or more components of the network 110.

Although not illustrated, the gateway server 115, the application execution server 120, the event stream server 125, the data processing server 130, the database 135, and the event database 140 may include similar components as the customer server 105 (an electronic processor, a memory, and a communication interface). However, in some embodiments, the gateway server 115, the application execution server 120, the event stream server 125, the data processing server 130, the database 135, the event database 140, or a combination thereof includes additional, fewer, or different components than the customer server 105.

Figure 4:
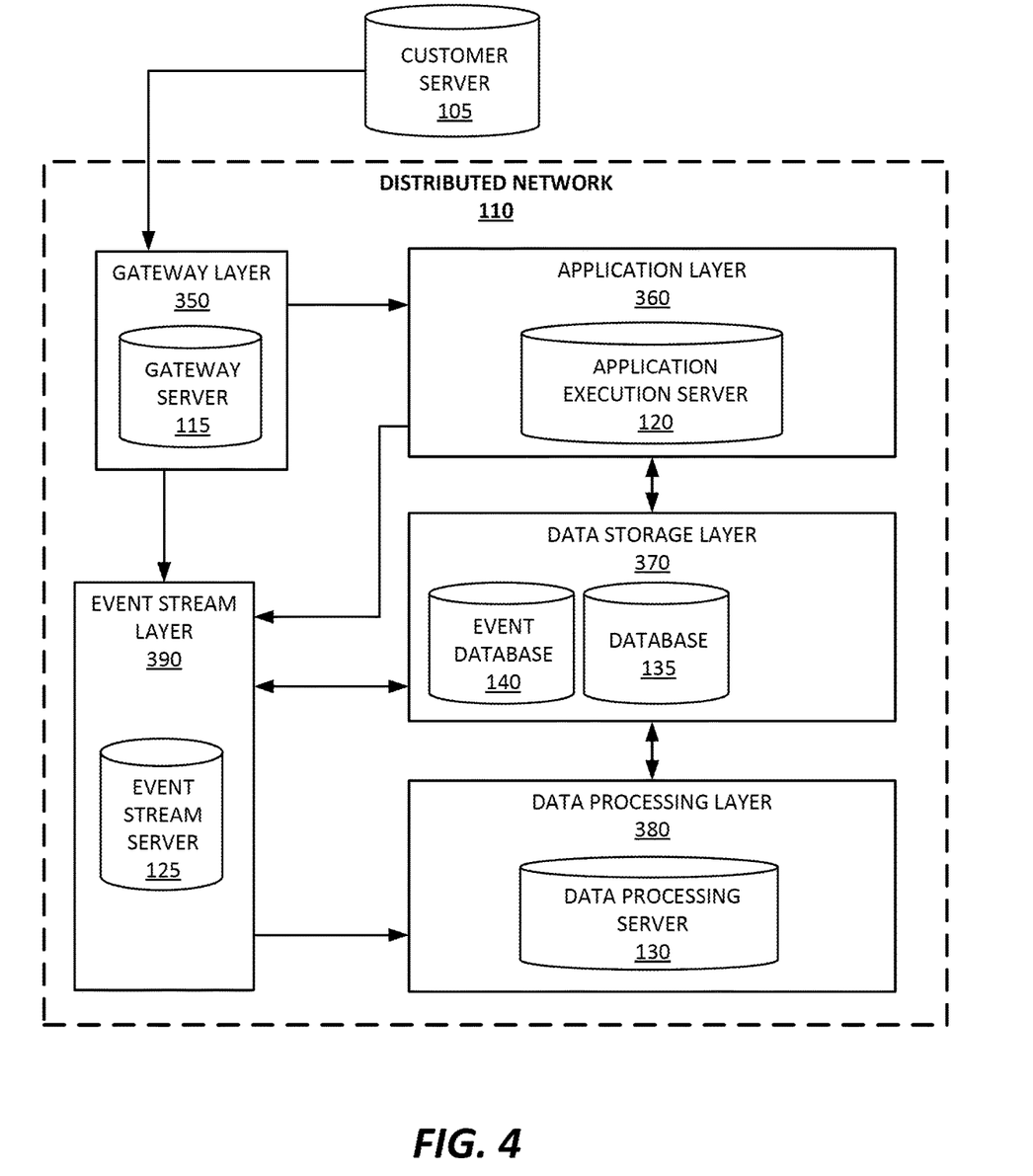
FIG. 4 is a block diagram illustrating a tiered application pattern provided by the system of FIG. 1 according to some embodiments.

In some embodiments, the network 110 has a multitier application architecture (or a multilayer application pattern). For example, as illustrated in FIG. 4, the network 110 may include a gateway layer 350, an application layer 360, a data storage layer 370, a data processing layer 380, and an event stream layer 390. In some embodiments, the network 110 may include additional, different, or fewer layers than illustrated in FIG. 4 in various configurations. Additionally, each layer may include additional, different, or fewer components than illustrated in FIG. 4 in various configurations.

As seen in FIG. 4, the gateway layer 350 may include the gateway server 115. The functionality described herein as being performed by the gateway layer 350 may be performed by the gateway server 115 (via an electronic processor executing instructions). The gateway layer 350 functions as an entry point to the network 110. In some embodiments, the gateway layer 350 serves as the only publicly accessible entry point to the network 110. As such, the gateway layer 350 is configured to receive one or more requests from the customer server 105 and process the received requests, and, ultimately, trigger application functionality (via the other layers of the tiered application pattern). Accordingly, in some embodiments, the gateway layer 350 contains or functions as an application programmable interface ("API") gateway. In some embodiments, the gateway layer 350 includes multiple technology components (not shown) incorporated into a single layer that serves a functional purpose. For example, the gateway layer 350 may include technology components that implement edge security technology, enforce encryption protocols, and the like. Accordingly, the gateway server 115 may validate request structure, enforce one or more security rules, and the like.

The application layer 360 may include the application execution server 120. The functionality described herein as being performed by the application layer 360 may be performed by the application execution server 120 (via an electronic processor executing instructions). The application execution server 120 executes (or performs) application or product functionality that supports an underlying application of the network 110. The functionality may include, for example, enriching request metadata with enrichment information, such as user agent related information, GeoIP related information, and the like. Alternatively or in addition, the functionality may include, for example, validating a request based at least in part on enrichment information added to request metadata. Alternatively or in addition, the functionality may include, for example, the business logic for handling and responding to incoming requests from the gateway server 115. As seen in FIG. 4, in some embodiments, the application execution server 120 may interact with the data storage layer 370 as part of performing the functionality. For example, the application execution server 120 may access enrichment information from the database 135 and enrich the request by adding or supplementing the request metadata with the enrichment information accessed from the database 135. Alternatively or in addition, in some embodiments, the application execution server 120 interacts with the event stream layer 390. For example, the application execution server 120 may write one or more events to the event stream layer 390 for further processing by the data processing layer 380.

The event stream layer 390 may include the event stream server 125. The functionality described herein as being performed by the event stream layer 390 may be performed by the event stream server 125 (via an electronic processor executing instructions). The event stream server 125 provides event stream processing. Events are streamed into the event stream layer 390 (for example, from the application execution server 120, the gateway server 115, or a combination thereof). An event streamed into the event stream layer 390 may be stored in the event database 140 for further processing with the data processing layer 380 (via the data processing server 130). The event stream layer 390 (the event stream server 125) may include an event aggregation component (not shown) that aggregates events for bulk or batch processing by, for example, the data processing server 130. In some embodiments, the event stream server 125 triggers the data processing server 130 (for example, with an event notification) to, for example, access and process one or more events stored in the event database 140.

The data processing layer 380 may include the data processing server 130. The functionality described herein as being performed by the data processing layer 380 may be performed by the data processing server 130 (via an electronic processor executing instructions). The data processing server 130 is configured to access and process one or more events from the event database 140.

For example, the data processing server 130 may generate an updated version of enrichment information and transmit the updated version to the database 135 for storage. In some embodiments, the updated version replaces a previous version of the enrichment information. In other words, an active version of the enrichment information may be stored in the database 135 prior to the data processing server 130 processing an event associated with an update to the enrichment information (as an update event). That active version of the enrichment information may be actively accessible for request enrichment by the application execution server 120. In other words, the application execution server 120 may actively access the active version of the enrichment information to supplement request metadata. After the data processing server 130 generates and transmits an updated version of the enrichment information (pursuant to the update) to the database 135, the updated version may replace the active version. In other words, the updated version of the enrichment information becomes the most-recent version of the enrichment information, and, therefore, is the actively accessible version of the enrichment information that the application execution server 120 accesses for request enrichment. Accordingly, the data processing server 130 may dynamically update enrichment information stored in the database 135 while the enrichment information (for example, other versions of the enrichment information) remains actively accessible for request enrichment performed by the application execution server 120.

As noted above, in some embodiments, the data processing server 130 accesses multiple events for bulk or batch processing. Accordingly, the data processing layer 380 may utilize the notion of notifications and queues to create fan out capabilities. For example, the data processing layer 380 (or another layer) may include a notification component (not shown) and a queue component (not shown). Accordingly, in some embodiments, the system 100 (for example, the event stream layer 390, the data processing layer 380, the data storage layer 370, or a combination thereof) implements a distributed notification architecture where updates are handled out of band (for example, out of band from the request enrichment performed by the application execution server 120). Additionally, when events are fanned out, the events may be processed multiple times by different compute functions.

The data storage layer 370 may include the database 135 and the event database 140. In some embodiments, the data storage layer 370 may include additional, fewer, or different components or databases than those illustrated in FIG. 4 in various configurations. For example, in some embodiments, the database 135, the event database 140, or a combination thereof may be combined within a single database or distributed among multiple databases (for example, the user agent database 135A and the GeoIP database 135B of FIG. 3). As noted above, the event database 140 stores events associated with the requests received at the gateway server 115. The database 135 stores the enrichment information (including a plurality of versions of the enrichment information).

Figure 5:
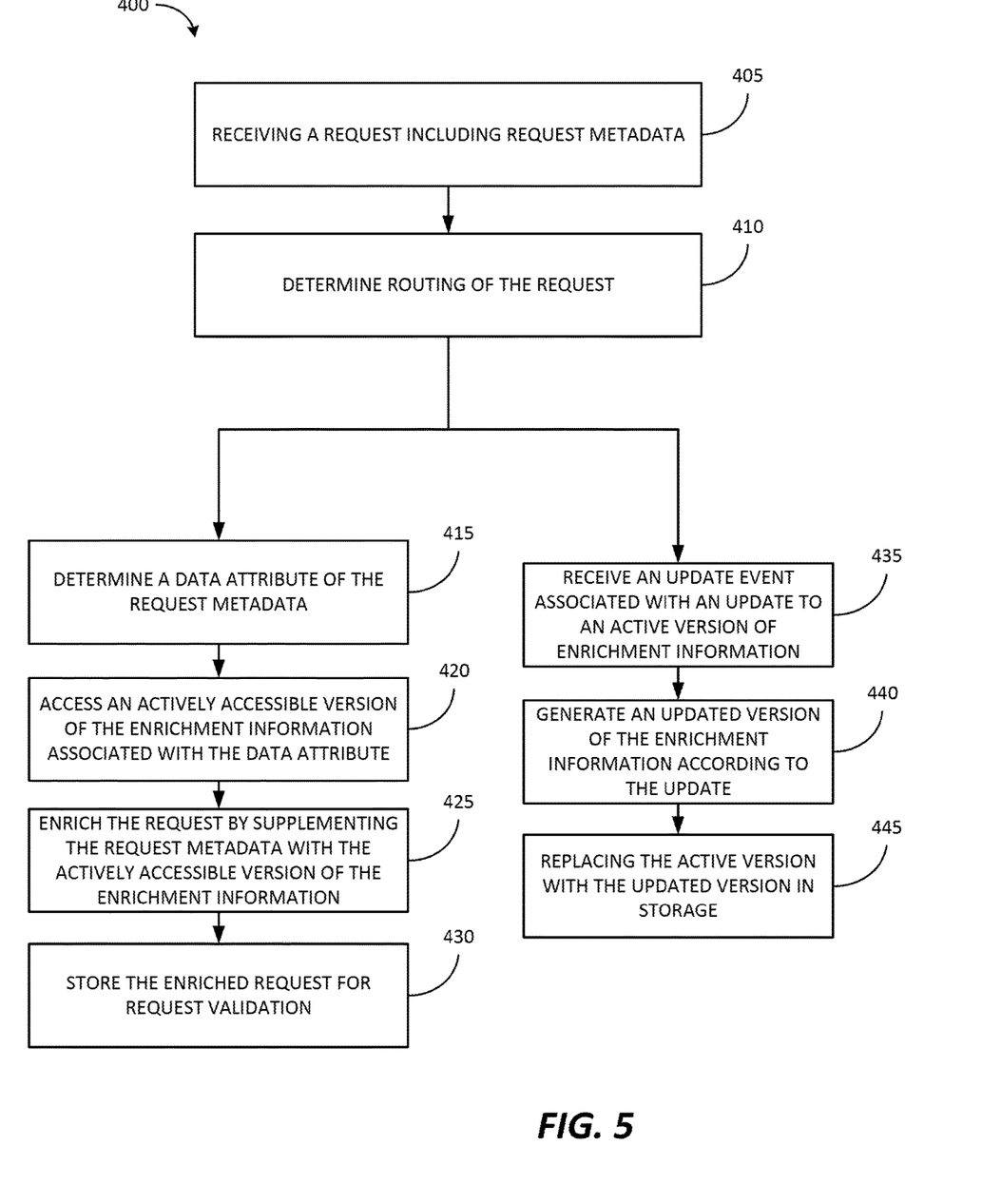
FIG. 5 is a flowchart of a method of providing distributed enrichment information updating using the system of FIG. 1 according to some embodiments.
Figure 6:
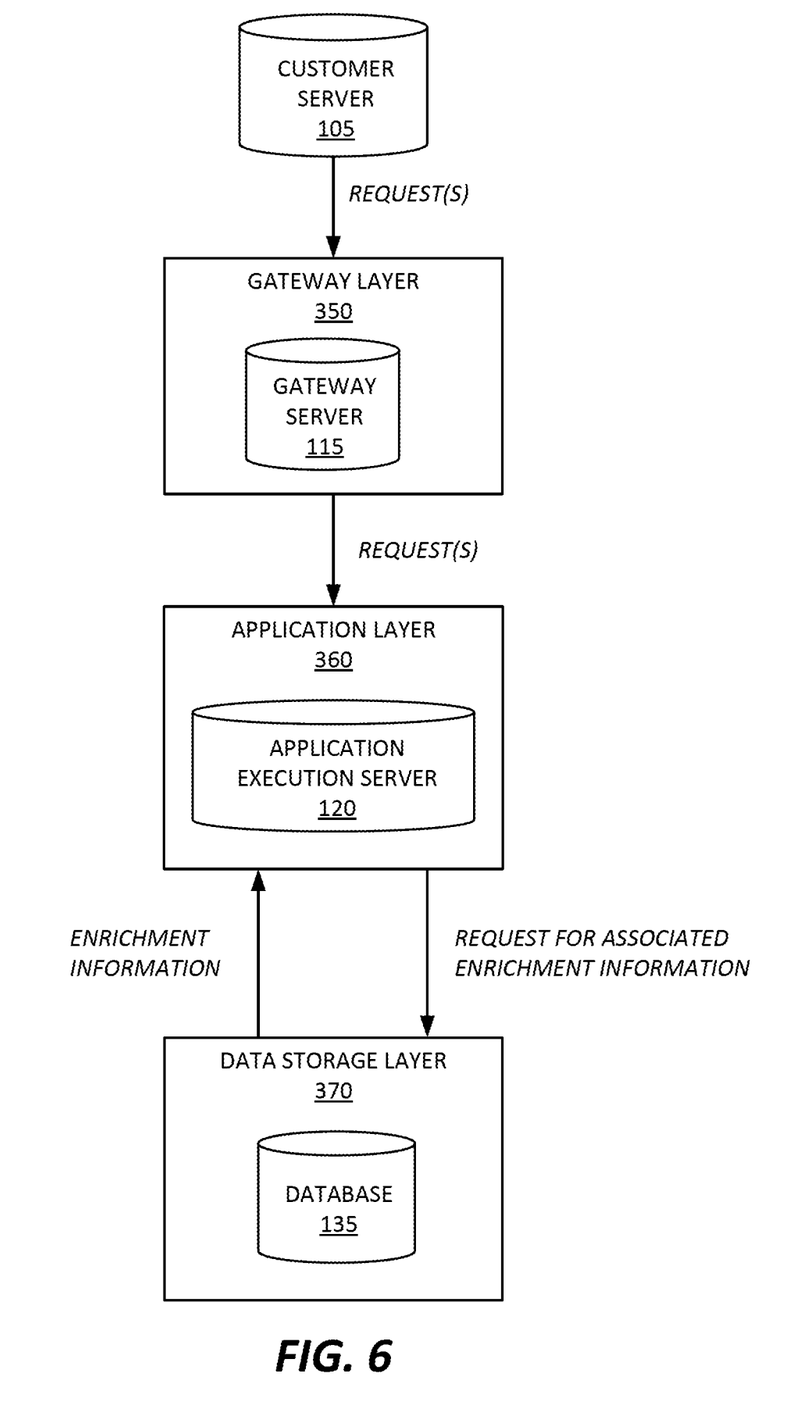
FIG. 6 schematically illustrates an example communication or data flow for a request enrichment process according to some embodiments.
Figure 7:
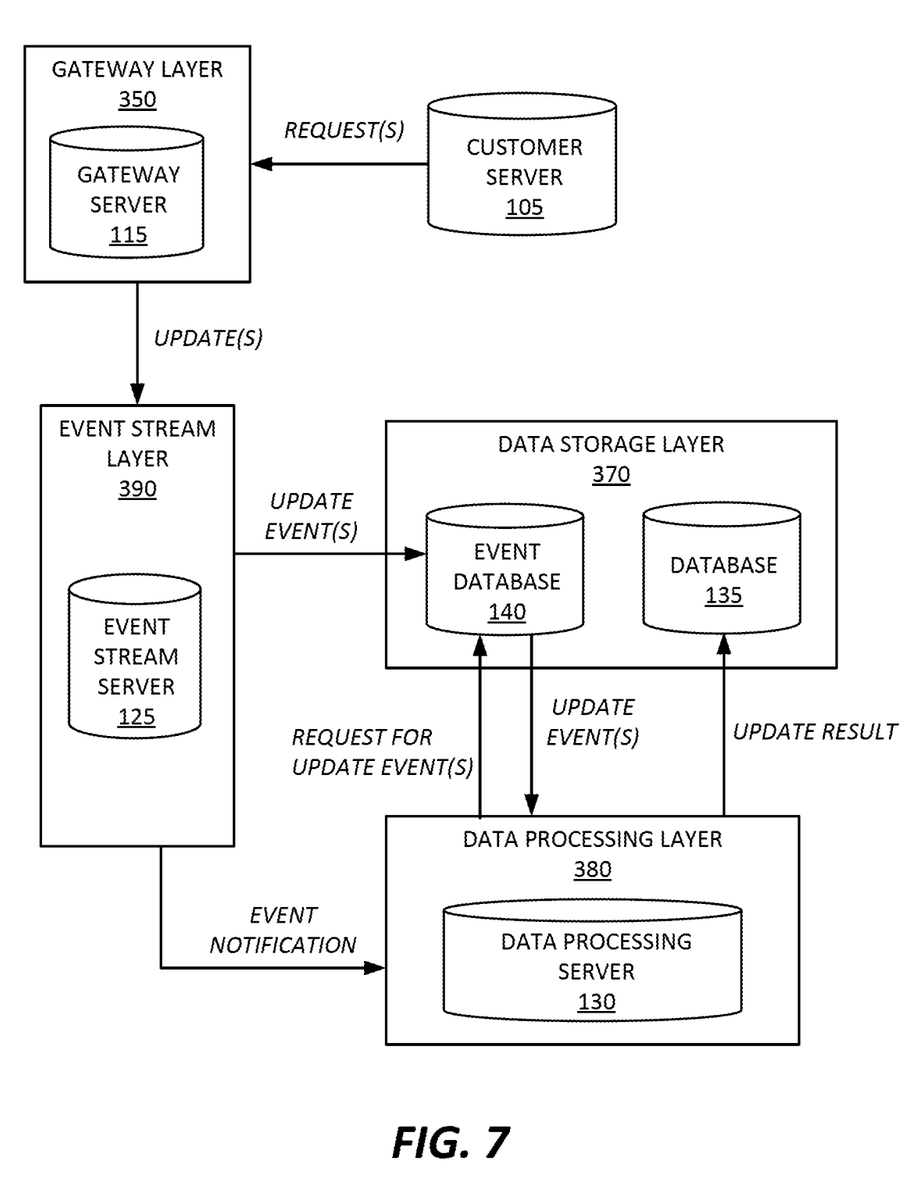
FIG. 7 schematically illustrates an example communication or data flow for an enrichment information update process according to some embodiments.

FIG. 5 is a flowchart illustrating a method 400 for distributed enrichment information updating according to some embodiments. The method 400 will be described with reference to FIGS. 4 and 6-7. FIG. 4 illustrates the decoupled design and distributed notification architecture of the system 100. FIG. 6 schematically illustrates an example communication or data flow for the request enrichment process described above with respect to blocks 415-430 of the method 400 according to some embodiments. FIG. 7 schematically illustrates an example communication or data flow for the enrichment information update process described above with respect to blocks 435-445 of the method 400 according to some embodiments.

As seen in FIG. 5, the method 400 includes receiving a request (at block 405). As noted above and illustrated in FIG. 4, the gateway server 115 may receive the request from a customer server 105. In some embodiments, the gateway server 115 receives the request from the customer server 105 through the communication network 150. For example, the gateway server 115 may receive the request from the customer server 105 through a virtual private network ("VPN"), a public connection (for example, public internet), and the like.

After receiving the request from the customer server 105, the gateway server 115 processes the request to determine routing for the request (at block 410). For example, as seen in FIGS. 4 and 6-7, the gateway server 115 may transmit the request to the event stream server 125, the application execution server 120, or a combination thereof. The gateway server 115 may determine routing for a request based on a characteristic of the request, such as a request type, request metadata, and the like. In some embodiments, the gateway server 115 determines whether the request is related to request enrichment. When the gateway server 115 determines that the request is related to request enrichment, the gateway server 115 may transmit the request to the application execution server 120 for request enrichment, as seen in FIG. 6. Alternatively or in addition, the gateway server 115 determines whether the request is associated with an update to enrichment information. When the gateway server 115 determines that the request is associated with an update to enrichment information, the gateway server 115 may transmit the request to the event stream server 125 for further processing by the data processing server 130, as seen in FIG. 7.

In response to receiving the request (for example, an enrichment request) from the gateway server 115, the application execution server 120 performs application functionality to enrich the request. As part of the request enrichment process, the application execution server 120 evaluates the request metadata to identify one or more data attributes included in the request metadata (at block 415). A data attribute may include, for example, user agent related information, GeoIP related information, another type of data attribute, or a combination thereof.

User agent related information may include a user agent associated with the request, such as a web browser. Alternatively or in addition, the user agent related information may include one or more characteristics of the user agent associated with the request, such as a version, an operating system, and the like. As one example, the request metadata may identify a web browser as the user agent and a version of the web browser. GeoIP related information may include, for example, a virtual location associated with the request, such as an IP address. As one example, the request metadata may identify an IP address as a virtual location associated with the request.

In response to the request metadata including the data attribute, the application execution server 120 accesses an actively accessible version of enrichment information associated with the data attribute (at block 420) and enriches the request by supplementing the request metadata with the actively accessible version of the enrichment information associated with the data attribute (at block 425). In other words, depending on the type of data attribute present in the request metadata, the application execution server 120 will access enrichment information corresponding to that type of data attribute and add the corresponding enrichment information for that type of data attribute to the request metadata.

For example, when the request metadata includes user agent related information, the application execution server 120 accesses enrichment information associated with the specific user agent information included in the request metadata. Enrichment information associated with user agent related information may include, for example, an expected version, an expected operating system, another expected characteristic, or a combination thereof for a given user agent. For example, when the request metadata includes user agent related information associated with a specific web browser, the application execution server 120 may access enrichment information for that specific web browser, such as an expected version. After accessing the enrichment information (i.e., the expected version for that web browser), the application execution server 120 enriches the request by adding the expected version for that web browser to the request metadata. Accordingly, the supplemented request metadata of the enriched request may include the original request metadata (for example, the specific web browser and a version of the web browser) and the enrichment information added to the original request metadata (for example, the expected version for the web browser).

As another example, when the request metadata includes virtual location (GeoIP related information), such as an IP address associated with the request, the application execution server 120 may access enrichment information for that virtual location. Enrichment information for the virtual location may include a physical location, such as a billing address or a shipping address, associated with the virtual location. After accessing the enrichment information, the application execution server 120 enriches the request by adding the enrichment information for the virtual location to the request metadata. For example, the application execution server 120 may enrich the request by adding a billing address associated with an IP address to the request metadata. Accordingly, the supplemented request metadata of the enriched request may include the original request metadata (for example, the IP address associated with the request) and the supplemented enrichment information (for example, a billing address or a shipping address associated with the IP address).

As seen in FIG. 5, the method 400 also includes storing the enriched request for request validation (at block 430). In some embodiments, the application execution server 120 transmits the enriched request to another component or system, such as a validation server (not shown), for request validation. In other embodiments, the application execution server 120 performs request validation on the enriched request. In such embodiments, the application execution server 120 accesses the enriched request from storage, performs request validation on the enriched request, and transmits a response to or a result of the request validation for the enriched request.

The enriched request may be validated based on the supplemented request metadata (the original request metadata and added enrichment information). For example, when the supplemented request metadata indicates a mismatch between a physical location associated with the request, such as a billing address or a shipping address, and a virtual location associated with the request, such as an IP address, the request may be determined to be fraudulent. As another example, when the supplemented request metadata indicates that a web browser (the user agent associated with the request) is not using running JavaScript when JavaScript is available in the operating system of the web browser, the request may be determined to be fraudulent.

As noted above, in some embodiments, the request received at the gateway layer 350 is associated with an update to enrichment information. When the request is associated with an update to enrichment information, the gateway server 115 may route the request (as an update request or update event) to the event stream layer 390 for further processing by the data processing server 130, as seen in FIG. 7. Accordingly, in some embodiments, enrichment information updates (including creation of new enrichment information) are performed out-of-band from, for example, the request enrichment performed by the application layer 360.

In response to receiving the request event, the event stream server 125 processes the request event. In some embodiments, the event stream server 125 processes the request event by performing event aggregation with one or more request events, as noted above. The event stream server 125 forwards the request event to the event database 140 for storage. In some embodiments, the event stream server 125 also generates and transmits an event notification to the data processing server 130.

In response to receiving the event notification, the data processing server 130 may be triggered to access the update event. Accordingly, as seen in FIG. 5, the data processing server 130 receives (or accesses) the update event (at block 435). The update event may be associated with an update to an active version of the enrichment information. The data processing server 130 may access or receive the update event from the event database 140. As noted above, in some embodiments, the data processing server 130 may perform bulk or batch processing. Accordingly, in such embodiments, the data processing server 130 may access more than one request (aggregated requests) from the event database 140 and performs an update associated with the accessed requests.

After accessing the update event, the data processing server 130 may perform an update associated with the update event. For example, as seen in FIG. 5, the data processing server 130 may generate an updated version of the enrichment information according to the update associated with the update event (at block 440).

An update may include a partial or full update (or replacement) of information or entries included in the enrichment information (an active version or an actively accessible version of the enrichment information). For example, the data processing server 130 may update a subset of the entries included in the enrichment information (as a partial update). Alternatively or in addition, the data processing server 130 may update all entries included in the enrichment information (as a full update). The data processing server 130 may perform updates to enrichment information in an incremental manner such that each update request triggers the generation of a new, subsequent version of the enrichment information (as an updated version to an active version). In some embodiments, an update associated with enrichment information includes the creation or generation of new enrichment information, such as a new user agent. Accordingly, in some embodiments, the data processing server 130, performs an update by generating an updated version of the enrichment information according to the update associated with the request event. Alternatively or in addition, in some embodiments, the data processing server 130 performs an update by generating new enrichment information.

After performing the update, the data processing server 130 transmits a result of performing the update operation (a derived data set of enrichment information or update result). The result of performing the update operation may include, for example, new enrichment information, an updated version of the enrichment information, and the like. For example, as seen in FIG. 5, the data processing server 130 replaces the active version of the enrichment information with the updated version of the enrichment information in storage (at block 445). As seen in FIGS. 4 and 7, the data processing server 130 may transmit the result to the database 135 for storage as enrichment information. As noted above, the data processing server 130 may perform updates to enrichment information in an incremental manner. Accordingly, in such embodiments, the database 135 stores multiple versions of enrichment information. For example, the database 135 may store an active version of enrichment information currently relied upon by the application execution server 120 for request enrichment and one or more previous versions. In some embodiments, upon receipt of the updated version at the database 135, the updated version becomes the active version (an actively accessible version) that the application execution server 120 relies on for request enrichment.

In some embodiments, application execution server 120 (for example, request application code) understands how the database 135 exists and is able to automatically attempt to upgrade such that a latest or most updated version of enrichment information is relied upon for request enrichment. However, when a latest or most updated version is unavailable, the application execution server 120 may fall back on a previous version of enrichment information (when a previous version is available).

Accordingly, in some embodiments, the event stream server 125 effectively issues an update (as an update event) or detects when enrichment information has been modified through notifications to an update queue (for example, the event database 140). The queue may be used to replicate changes to multiple enrichment information database instantiations dynamically. The queue is processed by a data processing application (for example, via the data processing server 130), which acts on the update (for example, the update event) and modifies an active version of enrichment information or creates a new version of enrichment information. In other words, the embodiments described herein update enrichment information using a distributed enrichment information updating system having a decoupled design and a distributed notification architecture such that updates are handled out-of-band.

Thus, the embodiments described herein provide, among other things, methods and systems for distributed enrichment information updating.

Various features and advantages of the invention are set forth in the following claims.

What is claimed is:

1. A method for providing distributed GeoIP information updating, the method comprising:
    receiving, with a data processing server, from an event database, an update event associated with an update to an active version of GeoIP information, the active version of the GeoIP information is actively accessible by an application execution server for request enrichment in a storage device, wherein GeoIP information is geographical information associated with an Internet Protocol (IP) address;
    generating, with the data processing server, an updated version of the GeoIP information according to the update associated with the update event, wherein the updated version is associated with an update result of the data processing server performing an update operation; and
    replacing, with the data processing server, the active version with the updated version in the storage device by transmitting the update result to the storage device while the application execution server performs request enrichment with the active version of the GeoIP information, wherein, in response to storing the updated version, the updated version is actively accessible by the application server for request enrichment.

2. The method of claim 1, further comprising:
    receiving, with the application server, a request including request metadata;
    in response to the request metadata including a data attribute,
        accessing, with the application server, an actively accessible version of the GeoIP information associated with the data attribute, and
        enriching, with the application server, the request by supplementing the request metadata with the actively accessible version of the GeoIP information; and
    storing, with the application server, the enriched request for request validation.

3. The method of claim 2, further comprising:
    accessing the enriched request from the storage device; and
    validating the enriched request based on the supplemented request metadata of the enriched request.

4. The method of claim 1, wherein generating the updated version of the GeoIP information includes generating the updated version of the GeoIP information out-of-band from the request enrichment.

5. A system for providing distributed GeoIP information updating, the system comprising:
    an application execution server, the application execution server includes a processor and is configured to
        receive a request including request metadata,
        in response to the request metadata including a data attribute,
            access an actively accessible version of GeoIP information associated with the data attribute, wherein the GeoIP information is dynamically updated by a data processing server transmitting a result of performing an update operation using update events stored in an event database to storage while the actively accessible version of the GeoIP information is actively accessible, wherein GeoIP information is geographical information associated with an Internet Protocol (IP) address, and
            enrich the request by supplementing the request metadata with the actively accessible version of the GeoIP information while the GeoIP information is dynamically updated, and
        generate an enriched request for request validation.

6. The system of claim 5, further comprising:
    a data processing server communicatively coupled to the application execution server and the event database, the data processing server configured to
        receive an update event associated with an update to an active version of the GeoIP information, the active version of the GeoIP information actively accessible for request enrichment,
        generate an updated version of the GeoIP information according to the update, and
        replace the active version with the updated version in the storage, wherein, in response to storing the updated version, the updated version is actively accessible for request enrichment.

7. The system of claim 6, wherein the data processing server is configured to generate the updated version of the GeoIP information out-of-band from the request enrichment.

8. The system of claim 6, wherein the data processing server is configured to dynamically generate the updated version of the GeoIP information according to the update while at least one version of the GeoIP information is actively accessible.

9. The system of claim 5, wherein the data attribute includes a virtual location associated with the request.

10. The system of claim 9, wherein the GeoIP information includes a physical location associated with the virtual location.

11. The system of claim 5, wherein the application execution server is further configured to store the enriched request.

12. The system of claim 5, wherein the application execution server is further configured to transmit the enriched request to a validation server for request validation.

13. The system of claim 5, wherein the application execution server is further configured to validate the enriched request based on the supplemented request metadata of the enriched request.

14. The system of claim 13, wherein the application execution server is configured to validate the enriched request based on a comparison of the data attribute and the GeoIP information.

15. A non-transitory, computer-readable medium storing instructions that, when executed by an electronic processor, perform a set of functions, the set of functions comprising:
receiving a request including request metadata;
determining whether the request metadata includes a set of data attributes,
in response to the request metadata including the set of data attributes,
accessing an actively accessible version of GeoIP information associated with the set of data attributes, wherein the GeoIP information is dynamically updated by transmitting a result of performing an update operation using update events stored in an event database to storage while the actively accessible version of the GeoIP information is actively accessible, wherein GeoIP information is geographical information associated with an Internet Protocol (IP) address, wherein, and
enriching the request by supplementing the request metadata with the actively accessible version of the GeoIP information while the GeoIP information is dynamically updated; and enabling access to the enriched request for request validation.

16. The computer-readable medium of claim 15, wherein the set of functions further comprises:
validating the enriched request based on a comparison of the set of data attributes and the actively accessible version of the GeoIP information used to supplement the request metadata.

17. The computer-readable medium of claim 15, wherein determining whether the request metadata includes a set of data attributes includes determining whether the request metadata includes a set of data attributes related to a virtual location associated with the request.

18. The computer-readable medium of claim 15, wherein accessing the actively accessible version of the GeoIP information associated with the set of data attributes includes accessing the actively accessible version from a data storage layer.

19. The computer-readable medium of claim 15, wherein accessing the actively accessible version of the GeoIP information includes accessing an actively accessible version of the GeoIP information related to a physical location associated with a virtual location of the request.

20. The computer-readable medium of claim 15, wherein enriching the request by supplementing the request metadata with the actively accessible version of the GeoIP information includes enriching the request out-of-band from the dynamic updating of the GeoIP information.

* * * * *